United States Patent

Kelly

[11] Patent Number: 5,932,105
[45] Date of Patent: Aug. 3, 1999

[54] METHOD OF POLYESTER MANUFACTURING USING CROSSFLOW MEMBRANE FILTRATION

[75] Inventor: Michael D. Kelly, Memphis, Tenn.

[73] Assignee: Mobile Process Technology, Co., Memphis, Tenn.

[21] Appl. No.: 08/942,250

[22] Filed: Oct. 1, 1997

[51] Int. Cl.$^6$ .................................................. B01D 61/00
[52] U.S. Cl. ...................... 210/651; 210/650; 210/660; 210/663; 210/681
[58] Field of Search ..................... 210/650, 651, 210/654, 660, 663, 680, 681, 652; 203/33

[56] References Cited

U.S. PATENT DOCUMENTS

| | | | |
|---|---|---|---|
| 2,788,373 | 4/1957 | Mills, Jr. et al. | 260/637 |
| 3,367,847 | 2/1968 | Pierson | 203/41 |
| 3,408,268 | 10/1968 | Pitts et al. | 203/78 |
| 3,491,161 | 1/1970 | Pitts | 260/637 |
| 3,878,055 | 4/1975 | Cox et al. | 203/37 |
| 4,013,519 | 3/1977 | Hoppert et al. | 203/33 |
| 4,100,253 | 7/1978 | Dougherty et al. | 423/87 |
| 4,118,582 | 10/1978 | Walker | 560/96 |
| 4,225,394 | 9/1980 | Cox et al. | 203/37 |
| 5,034,134 | 7/1991 | George et al. | 210/651 |
| 5,102,549 | 4/1992 | George et al. | 210/639 |
| 5,158,651 | 10/1992 | Doerr | 203/33 |
| 5,194,159 | 3/1993 | George et al. | 210/654 |
| 5,510,036 | 4/1996 | Woyciesjes et al. | 210/664 |

OTHER PUBLICATIONS

Encyclopedia of Separation Technology, vol. 2., pp. 1230–1233, 1241–1249 ,D. Ruthven, ed. (John Wiley & Sons, 1997).

*Primary Examiner*—Ana Fortuna
*Attorney, Agent, or Firm*—Ray F. Cox, Jr.; J. Charles Dougherty

[57] ABSTRACT

An improved process for the manufacture of polyester resin from the esterification of an aromatic acid with a glycol followed by polycondensation in the presence of a metal oxide catalyst in which spent glycol is removed during the course of the polycondensation reaction along with insolubles, large particulates, low molecular weight oligomers, metal oxide catalyst, cation impurities and anion impurities, and trace amounts of other impurities in which the temperature of the spent glycol is increased to maintain the monomer dissolved in solution while passing the spent glycol to a crossflow membrane filtration device with sufficient fluid velocity across the crossflow membrane filtration device to maintain turbulent flow. The glycol permeate is recycled to the esterification process while the concentrated insolubles are separated from the purged retentate.

6 Claims, 2 Drawing Sheets

METHOD OF POLYESTER MANUFACTURING USING CROSSFLOW MEMBRANE FILTRATION

TECHNICAL FIELD

The present invention relates to the use of crossflow membranes for the treatment of spent glycol produced in the manufacture of polyester resins, and in particular, to the removal of impurities, the recovery of product resins, and the recycle of purified glycol to the resin manufacturing process.

BACKGROUND OF THE INVENTION

Polyester resins may be produced by the esterification of aromatic acids with various glycols. For example, the esterification of terephthalic acid (TA) with ethylene glycol (EG) produces polyethylene terephthalate (PET), a widely used polyester resin in, for example, the food packaging and textile fiber industries.

PET is a linear polyester which is generally manufactured in two stages by (1) esterification of terephthalic acid (TPA) with an excess of ethylene glycol (EG) or by the ester exchange reaction of dimethyl terephthalate (DMT) and an excess of EG to form dihydroxyethyl terephthalate (DHET), and (2) the polycondensation of DHET in the presence of a metal oxide catalyst. The metal oxide catalyst is typically an oxide of antimony or germanium.

The first stage ester reaction requires an excess of EG. The excess EG is removed during the course of the polycondensation reaction along with other products such as low molecular weight terephthalate oligomers, diethylene glycol (DEG), metal oxide catalysts and trace amounts of other compounds. The EG containing impurities is hereinafter referred to as spent glycol (SG). The presence of impurities in the spent glycol prevents recycling of the spent glycol into the first stage esterification since product quality would be detrimentally affected thereby. In particular, when product having little or no color and free of insoluble particulate matter is required, spent glycol is unsuitable for recycling.

The prior art on recycling spent glycol relies primarily on flash distillation of the spent glycol as typified by U.S. Pat. Nos. 3,408,268, 3,367,847 and 2,788,373. There are numerous variations to the basic distillation process. For example, U.S. Pat. No. 3,878,055 teaches flash distillation of spent glycol in the presence of an alkali metal hydroxide, while U.S. Pat. No. 3,491,161 teaches the addition of ammonium hydroxide prior to distillation. Some attempts have been made to remove antimony by precipitation prior to distillation of the spent glycol. Typical of these processes are U.S. Pat. Nos. 4,118,582 and 4,013,519.

In practice, spent glycol is purified by distillation in which a pure EG overhead product is recovered. The refined EG is typically recycled to the esterification process. The still bottoms resulting from the distillation of the spent glycol is a mixture of antimony or germanium oxide catalyst, titanium dioxide, optical enhancers, terephthalate oligomers, EG and DEG and various trace impurities such as trace cations, trace anions and color forming impurities.

Significantly, large quantities of still bottoms are generated in the United States each year which presents serious environmental as well as economic problems for PET producers. Furthermore, disposal of the still bottoms as a waste product represents the loss of substantial quantities of EG, DEG, catalysts, and terephthalate oligomers, all of which have commercial value.

There is therefore, a need for a PET manufacturing process which removes contaminants from spent glycol and which allows for the recovery and recycle of the still bottoms. Especially desirable is an improved process in which all materials are recycled to either the PET manufacturing process or to other chemical manufacturing processes.

Other types of resins are manufactured using other aromatic acids and glycols. Other examples of aromatic acids include terephthalic acid, isophthalic acid, cyclohexane dicarboxylic acid, and 2,6-naphthalene dicarboxylic acid. Examples of glycols include ethylene glycol, diethylene glycol, 1,3-propanediol, and 1,4-butanediol. Other resins may be produced from the transesterification of methyl esters of aromatic acids with certain glycols. Examples of resins made with this process include dimethyl terephthalate with EG, and 2,6-dimethyl naphthalate with EG which produces polyethylene naphthalate (PEN) resins.

In general in the typical process for the production of polyester resins, the ester is initially produced from the reaction of an aromatic acid and a glycol. (The ester is the monomer from which the polymer is produced.) Glycol is produced during the polycondensation reaction of the ester. During the polycondensation step the excess glycol is removed from the reactor as a vapor along with other materials, including monomer and higher molecular weight oligomer, metal catalyst, delusterants such as titanium dioxide ($TiO_2$), and additives for optical enhancement.

As noted above, the SG is typically recovered and purified by conventional distillation methods in which the glycol is recovered as an overhead distillate product. The higher boiling impurities are removed as still bottoms. The still bottoms are typically disposed of by incineration. The incineration process is very expensive in terms of lost monomer and glycols and the energy required to distill the glycol. The incineration process also produces considerable quantities of fly ash containing hazardous metals which results in an environmental disposal problem. There is therefore a need for an economical method to remove particulate matter from SG and to recycle the recovered glycol to the esterification process which avoids the costly, wasteful and environmentally detrimental distillation and incineration steps.

These and other problems of the prior art are solved by the present invention as described more fully below.

SUMMARY OF THE INVENTION

The present invention eliminates the distillation step required in the prior art for the recovery of glycol for recycle into the polyester resin manufacturing process by using crossflow membrane filtration to remove particulate material, including product resins, from the spent glycol. The resulting filtered glycol, or permeate, may be recycled to the manufacturing process or may be further treated to remove dissolved impurities before recycle.

Crossflow membrane filtration passes the feed stream over the filter medium transversely to the surface of the filter medium. A particulate free permeate passes through the filter medium, while a particulate concentrated retentate stream is added to the spent glycol stream for recirculation through the filter. While crossflow membrane filtration is more complex than ordinary filtration techniques, cross filtration has the advantage of avoiding plugging of the membrane filter and enhanced life. In order to remove the concentrated particulate product, however, it is necessary to purge a portion of the retentate stream. Membrane filter media are formed by a relatively thin layer of low porosity filter material supported on a substrate with relatively coarser pores.

It is also an important aspect of the present invention that the spent glycol is maintained at a high enough temperature while being filtered so as to maintain the monomer dissolved in solution. The monomer thus passes through the crossflow membrane filter with the permeate glycol so that the monomer is recycled to the esterification process.

Finally, it is also an important aspect of the present invention that the retentate stream pass over the crossflow membrane filter with sufficient fluid velocity to maintain turbulent flow. This ensures that plugging of the filter medium is minimized.

The improved process of the present invention thus comprises the steps of:

(a) increasing the temperature of the SG to maintain the monomer dissolved in solution (preferably from around 50 deg. C. to around 120 deg. C.);
(b) passing the SG through a coarse filter screen to remove larger particulates (greater than $1/16$ inch);
(c) passing the SG through a crossflow membrane filtration device with sufficient fluid velocity to maintain turbulent flow;
(d) collecting the filtered glycol (permeate) in a separate vessel;
(e) recycling the glycol permeate to the esterification process; and
(f) removing the concentrated retained particulate material (retentate).

In another embodiment of the process, the glycol permeate of step (d) may be passed through a series of sorption media to remove dissolved impurities before being recycled to the esterification process.

In step (f), the concentrated retentate may be removed by either of two methods: (1) continuous purge of a small portion of the recirculating SG, or (2) periodic "blow down" of a small volume of the recirculating SG.

DETAILED DESCRIPTION OF THE PREFERRED EMBODIMENTS

Figure 1:
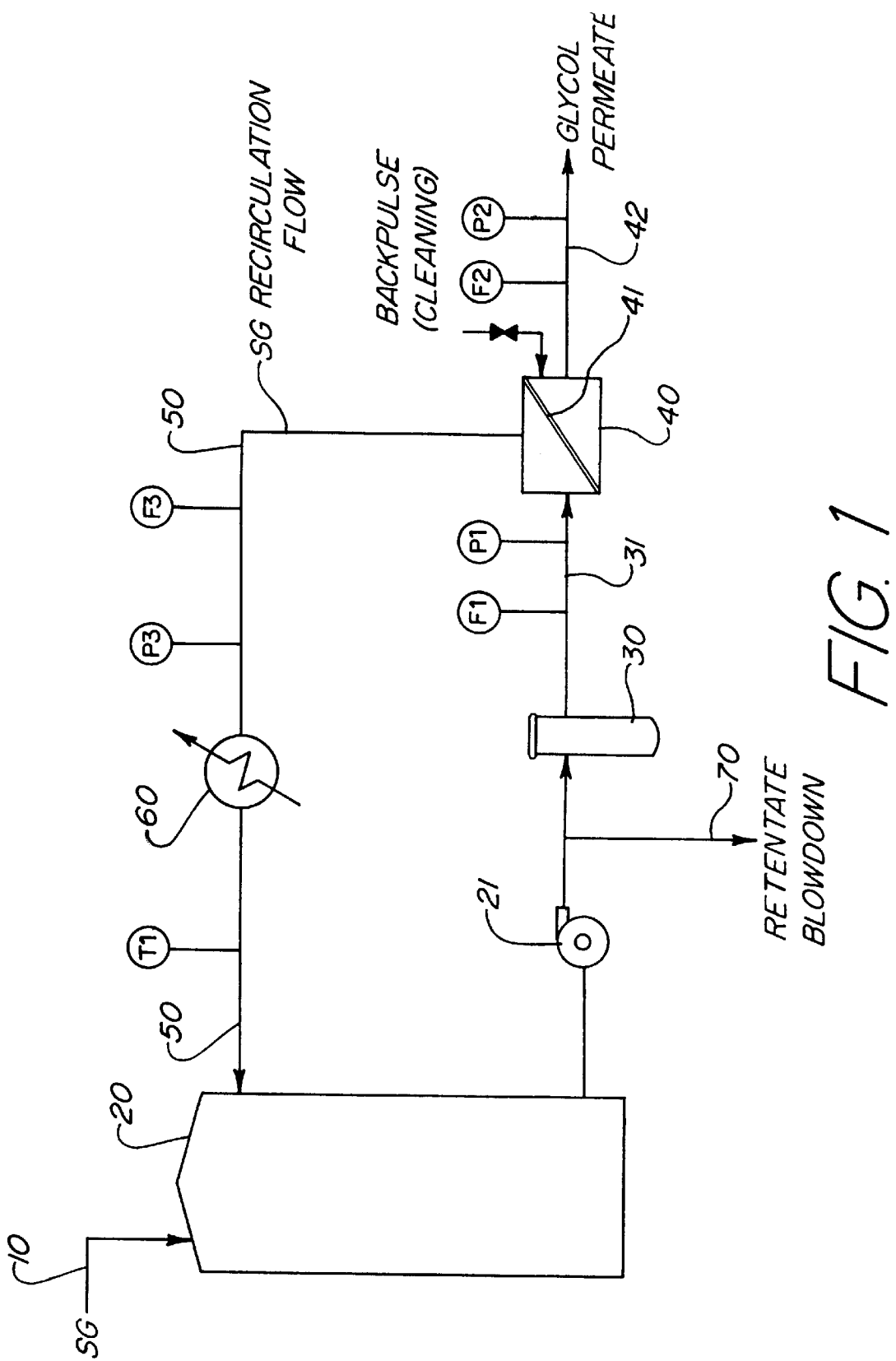
FIG. 1 is a schematic process flow diagram of the process of the present invention.

The preferred embodiment of the present invention may be described with reference to FIG. 1. Polyester resin is manufactured by the esterification of an aromatic acid with a glycol followed by polycondensation in the presence of a metal oxide catalyst. (This process is not shown.) Spent glycol is removed during the course of the polycondensation reaction along with product polyester resin, unpolymerized monomers, large particulates, low molecular weight oligomers, metal oxide catalyst, cation impurities and anion impurities, and trace amounts of other impurities. The spent glycol stream 10 is purged to the spent glycol recirculation tank 20.

The spent glycol is pumped from the spent glycol recirculation tank 20 by recirculating pump 21 to strainer 30 where the large particulates (greater than about $1/16$ inch) are removed. The filtered spent glycol is then passed via line 31 to crossflow membrane filter 40.

Although filtered of the large particulates, the spent glycol at this point is still loaded with the product polyester resin. Ordinary dead-end filters would rapidly plug from the concentration of product resin. Crossflow membrane filter 40 by contrast relies on recirculation of the spent glycol to prevent plugging of the pores of the membrane filtering medium 41. The filtering medium 41 acts to concentrate the product resin in the spent glycol stream and allows a concentrated stream of product-laden glycol to be withdrawn as described more fully below.

In order to prevent the plugging of the filter pores of the crossflow membrane filter 40, it is desirable to maintain a high enough flow rate of the spent glycol across the filtering medium 41 so that turbulent flow maintains the particulate solids in suspension.

The fluid flow in the crossflow membrane filter 40 is tangent to the membrane surface. The spent glycol is discharged to the membrane transversely to the flow of the recirculating spent glycol. The filtering medium 41 is preferably composed of ceramic materials or sintered metal alloy powders. The membrane itself consists of a very thin layer of the ceramic or sintered metal material on a much thicker and coarser substrate. The membrane pore size is sufficiently small for the micro or ultrafiltration of the particulate matter in the spent glycol.

The glycol permeate is withdrawn from the crossflow membrane filter 40 through permeate line 42. The glycol permeate containing the unreacted monomer is then recycled to the esterification process.

Figure 2:
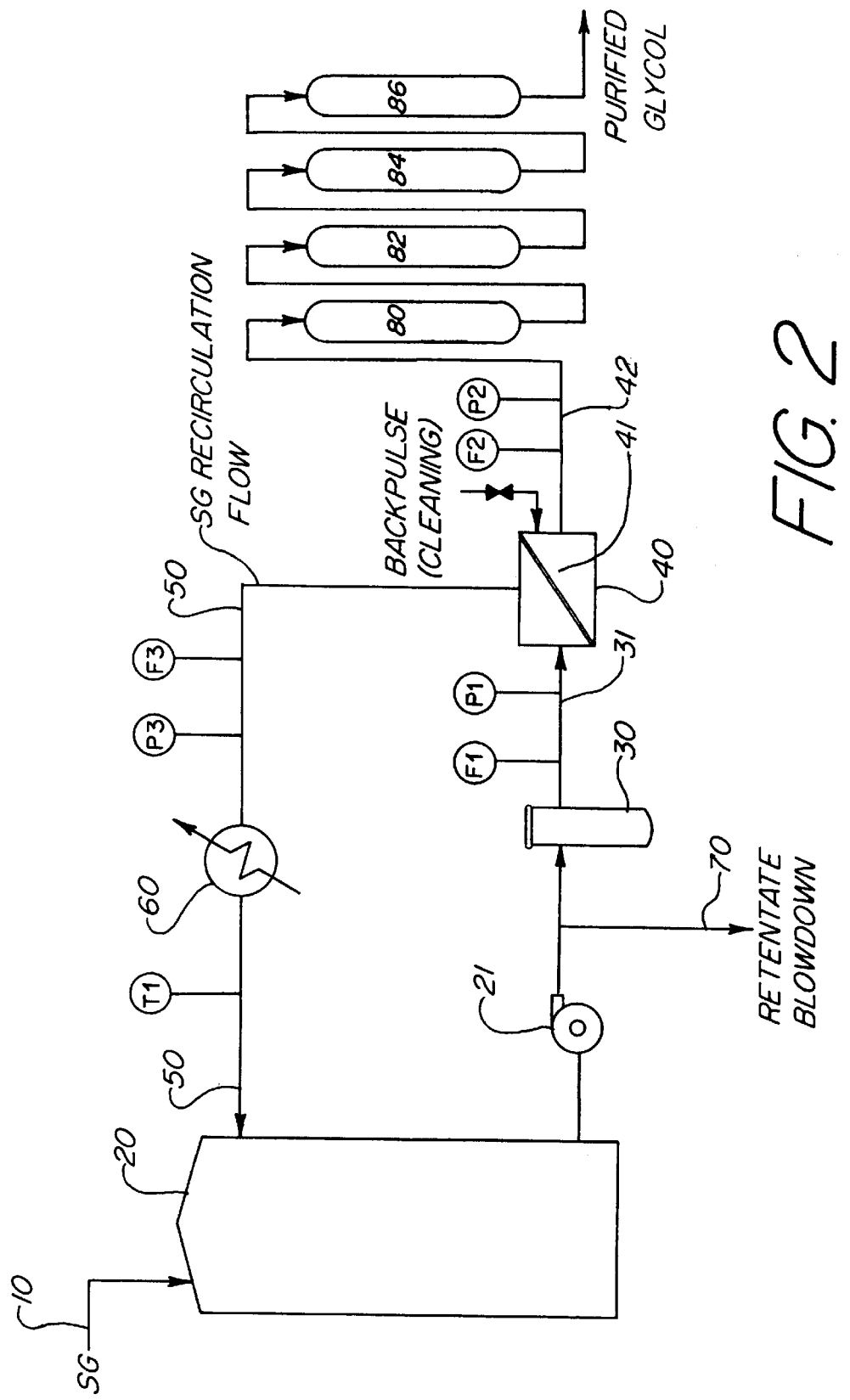
FIG. 2 is a schematic process flow diagram of an alternative embodiment of the process of the present invention which adds sorption beds.

In another embodiment of the present invention as depicted in FIG. 2, the glycol permeate may be passed through a series of sorption media to remove dissolved anion and cation impurities and other impurities before being recycled to the esterification process. Such a process is disclosed in U.S. Pat. No. 5,294,305, which is incorporated herein by reference.

In this embodiment, the glycol permeate may be maintained at a sufficient temperature to effect a lower viscosity solution which results in a lower pressure drop during filtration and to avoid the possibility of precipitation of oligomers. The glycol permeate may be passed through an granular activated carbon bed 80 to remove trace quantities of color forming impurities if they are present. Although other adsorbents may be used, granular activated carbon is the preferred adsorbent for the removal of color forming impurities. It is preferable to use the granular activated carbon bed 80 ahead of any ion exchange resins so that any dissolved solids leached off the granular activated carbon will be removed by the ion exchange resins.

Soluble metal oxide catalysts present in the glycol permeate may be removed by ion exchange with a strong or weak acid cation exchange resin bed 82. An anion exchange resin bed 84 may be used to remove soluble anions such as phosphates. Optionally, the glycol permeate may be further purified by passing the glycol through a mixed cation/anion resin to insure complete removal of soluble impurities. The glycol can be further purified as a "polishing" step by passing the glycol through a macroreticular polymer resin bed 86 which has very good absorption properties for color impurities and which can be regenerated. Suitable macroreticular resins include Rohm & Haas Amberlite XAD-2 and Purolite Macroret MN100.

The retentate stream from the crossflow membrane filter 40 contains the rejected insolubles. The retentate stream is recirculated via retentate line 50 through heat exchanger 60 to the spent glycol recirculation tank 20. The heat exchanger 60 maintains the recirculating glycol stream at a sufficiently high temperature to keep the monomer in the spent glycol dissolved in the glycol solution. The monomer thus passes through the crossflow membrane filter with the glycol permeate where it is recycled to the esterification process. The heat exchanger preferably maintains the temperature of the recirculating glycol stream at around 50 degrees Celsius to around 120 degrees Celsius.

The recirculating spent glycol from the spent glycol recirculation tank 20 contains concentrated insoluble materials due to the glycol removed from the crossflow membrane filter 40. The glycol is removed, either continuously or periodically, from the system via retentate blowdown line 70. The insolubles may be separated from the glycol in the retentate by conventional methods such as distillation, centrifugation, or filtration.

The present invention has been illustrated and described with reference to specific embodiments, the present invention is not limited thereto. These are alternative modifications which will become apparent to those skilled in the art upon reading the foregoing description. Accordingly, such alternatives, changes and modifications, are to be considered as forming a part of the present invention is so far as they fall within the intent and scope of the claims described.

I claim:

1. An improved process for the manufacture of polyester resin from the esterification of an aromatic acid with a glycol followed by polycondensation in the presence of a metal oxide catalyst in which spent glycol is removed during the course of the polycondensation reaction along with insolubles, unpolymerized monomers, large particulates, low molecular weight oligomers, metal oxide catalyst, cation impurities and anion impurities, and trace amounts of other additives and impurities, comprising the steps of:

(a) increasing the temperature of the spent glycol to maintain the monomer dissolved in solution;

(b) passing the spent glycol through a coarse filter screen to remove large particulates;

(c) passing the spent glycol to a crossflow membrane filtration device with sufficient fluid velocity across the crossflow membrane filtration device to maintain turbulent flow such that a glycol permeate is produced that is free of insolubles but retains the dissolved monomer;

(d) collecting the glycol permeate from the crossflow membrane filtration device;

(e) recycling the glycol permeate to the esterification process;

(f) purging the retentate containing the concentrated insolubles; and (g) separating the concentrated insolubles from the purged retentate.

2. The improved process of claim 1, wherein the temperature of the spent glycol in step (a) is from around 50 degrees C. to around 120 degrees C.

3. The improved process of claim 1, wherein the coarse filter screen of step (b) removes particulates greater than around 1/16 inch.

4. The improved process of claim 1, comprising the additional step following step (d) of passing the glycol permeate of step (d) through a series of sorption media to remove dissolved cation and anion impurities and other impurities before being recycled to the esterification process.

5. The improved process of claim 1, wherein in step (f) the retentate is continuously purged.

6. The improved process of claim 1, wherein in step (f) the retentate is periodically purged.

* * * * *